US010140314B2

(12) United States Patent
Sirven et al.

(10) Patent No.: US 10,140,314 B2
(45) Date of Patent: *Nov. 27, 2018

(54) PREVIEWS FOR CONTEXTUAL SEARCHES

(71) Applicant: Adobe Systems Incorporated, San Jose, CA (US)

(72) Inventors: Olivier Sirven, Paris (FR); Sachin Soni, New Delhi (IN); Ashish Duggal, Delhi (IN); Anmol Dhawan, Ghaziabad (IN)

(73) Assignee: Adobe Systems Incorporated, San Jose, CA (US)

( * ) Notice: Subject to any disclaimer, the term of this patent is extended or adjusted under 35 U.S.C. 154(b) by 214 days.

This patent is subject to a terminal disclaimer.

(21) Appl. No.: 14/832,722

(22) Filed: Aug. 21, 2015

(65) Prior Publication Data

US 2017/0052937 A1    Feb. 23, 2017

(51) Int. Cl.
| | |
|---|---|
| *G06F 17/24* | (2006.01) |
| *G06F 17/30* | (2006.01) |
| *G06F 3/0484* | (2013.01) |
| *G06F 17/21* | (2006.01) |
| *G06F 17/27* | (2006.01) |
| *G06F 3/0482* | (2013.01) |

(52) U.S. Cl.
CPC ...... *G06F 17/30256* (2013.01); *G06F 3/0482* (2013.01); *G06F 3/04845* (2013.01); *G06F 17/212* (2013.01); *G06F 17/241* (2013.01); *G06F 17/278* (2013.01); *G06F 17/3028* (2013.01); *G06F 17/30244* (2013.01)

(58) Field of Classification Search
None
See application file for complete search history.

(56) References Cited

U.S. PATENT DOCUMENTS

| | | | |
|---|---|---|---|
| 6,021,412 A * | 2/2000 | Ho | ............... G06F 17/24 |
| 70,052,982 | 2/2017 | Sirven et al. | |
| 2009/0259731 A1 * | 10/2009 | Luk | ......... G06F 17/30893 709/219 |

(Continued)

OTHER PUBLICATIONS

"Pre-Interview Communication", U.S. Appl. No. 14/832,674, dated Jun. 30, 2017, 3 pages.

(Continued)

*Primary Examiner* — Asher D Kells
(74) *Attorney, Agent, or Firm* — Wolfe-SBMC

(57) ABSTRACT

Techniques to facilitate image searches using context of an image frame in a document are described. In one or more implementations, an image frame included within a document is detected, such as when the frame is inserted or selected. Content in the document in the vicinity of the image frame is analyzed to derive query terms corresponding to the content. Tag elements created for the query terms are exposed to enable selection of individual query terms as search parameters. An image search is conducted using selected query terms and images returned as results of the search are presented a candidates for insertion into the frame. Previews of images as being inserted in the image frame can be exposed show how the document would look with different images placed in the frame. Selection of a particular image from the arrangement causes insertion of the particular image into the image frame.

25 Claims, 13 Drawing Sheets

(56) References Cited

U.S. PATENT DOCUMENTS

| | | | | |
|---|---|---|---|---|
| 2009/0319897 A1* | 12/2009 | Kotler | ............... | G06F 3/04845 715/711 |
| 2011/0191336 A1* | 8/2011 | Wang | .................... | G06F 17/30 707/728 |
| 2012/0117092 A1* | 5/2012 | Stankiewicz | ..... | G06F 17/30654 707/755 |
| 2016/0048326 A1* | 2/2016 | Kim | .................. | G06F 3/04886 715/773 |

OTHER PUBLICATIONS

"First Action Interview Office Action", U.S. Appl. No. 14/832,674, dated Aug. 18, 2017, 3 pages.
"Final Office Action", U.S. Appl. No. 14/832,674, dated Jan. 24, 2018, 19 pages.
"Non-Final Office Action", U.S. Appl. No. 14/832,674, dated Jun. 6, 2018, 7 pages.
"Notice of Allowance", U.S. Appl. No. 14/832,674, dated Aug. 14, 2018, 5 pages.

\* cited by examiner

900

902
Output via a user interface for a digital media application image search results having candidate images for insertion in an image frame placed within a document exposed for editing in the user interface

904
Detect navigation interaction corresponding to a particular image of the candidate images

906
Responsive to detection of the navigation interaction, generate a preview of the document as the document would appear if the particular image is inserted into the image frame

908
Render the preview of the document via the user interface

*Fig. 9*

PREVIEWS FOR CONTEXTUAL SEARCHES

BACKGROUND

Today, individuals frequently use word processors, text editors, web development tools and other digital media applications to create and edit documents, articles, emails, and other work product. In connection with document creation and editing, users may seek to find images to include within documents as representation of portions of text and/or themes of different paragraphs, frames, or content items. Existing tools for searching a collection of stock images are typically user driven and rely upon users' ability to craft appropriate search queries to find images on interest. Additionally, image searches traditionally are conducted via a browser or other application that is separate from the digital media application used for document editing. Thus, not only do existing tools require considerable effort on the part of the users to specify queries, the process of conducting the search and switching between applications to view search results, manage the image results, and insert images into the document is complicated and time consuming.

SUMMARY

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

Techniques to facilitate image searches using context of an image frame in a document are described herein. The image search techniques can be implemented in connection with documents for various digital media applications to search for candidate images to place in an image frame within a document. In one or more implementations, a document can be created or edited using functionality exposed via a user interface for the digital media application. As part of this process, an image frame included within the document is detected, such as when the frame is inserted or selected. Content in the document in the vicinity of the image frame is analyzed to derive query terms corresponding to the content. Tag elements created for the query terms are exposed to enable selection of individual query terms to include as search parameters. An image search is conducted using selected query terms and images returned as results of the search are presented as an arrangement of candidate images for placement in the image frame. Previews of images as being inserted in the image frame can be exposed as part of the arrangement or responsive to interaction with individual images to show how the document would look with different images placed in the frame. Selection of a particular image from the arrangement causes insertion of the particular image into the image frame.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 9 is flow diagram for an example procedure in which previews are exposed depicting images returned as search results as being inserted into an image frame

DETAILED DESCRIPTION

Overview

Figure 1:
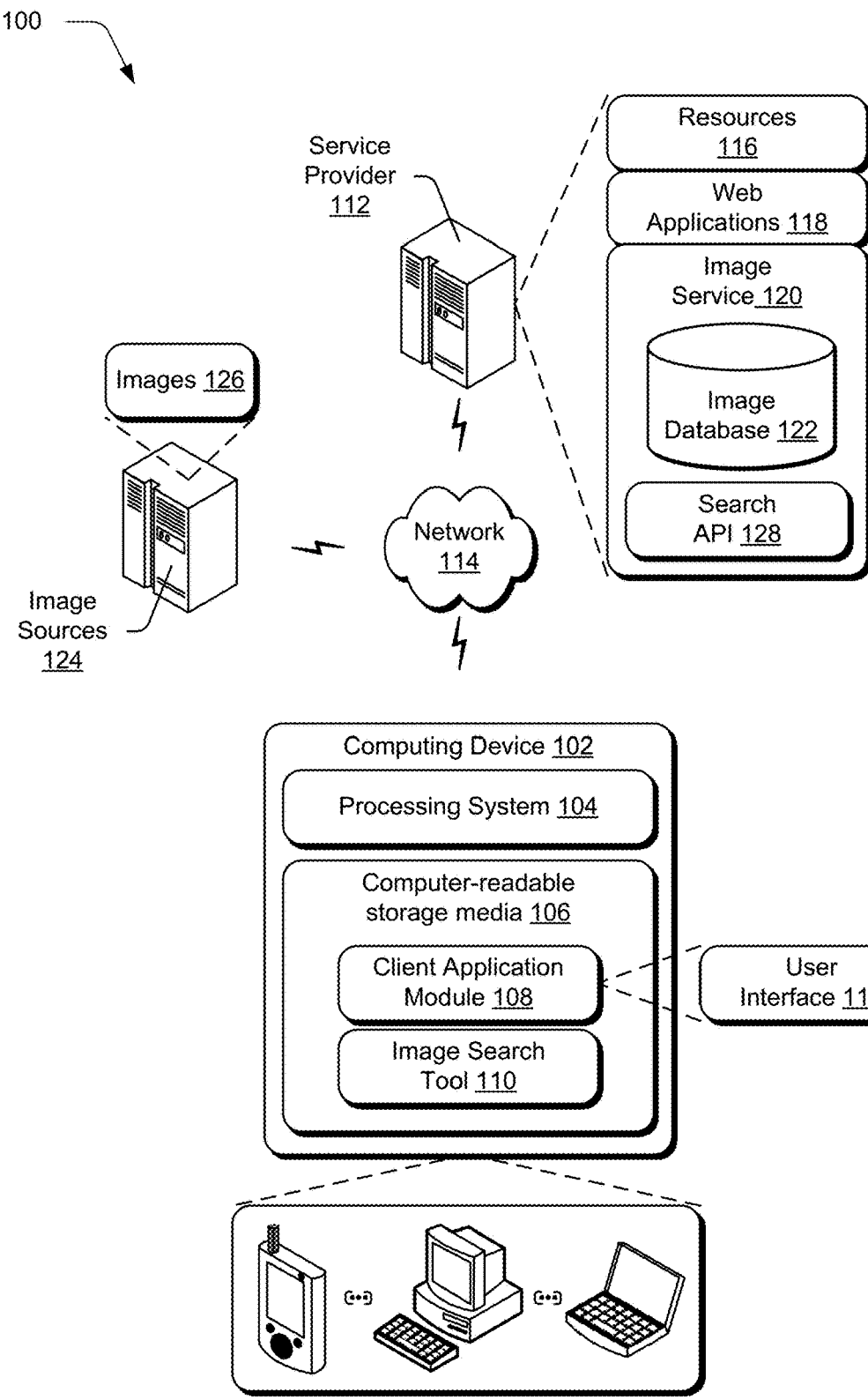
FIG. 1 is an illustration of an environment in an example implementation that is operable to employ techniques described herein.

In the case of image searches for creative content, users are typically interested in finding particular images to use within and represent the creative content. Existing tools and search engines require considerable effort on the part of users to initiate searches, generate the search queries, and perform actions to select an image from the results and place the selected image within a document. Consequently, the search process can be time consuming and inefficient.

Techniques to facilitate image searches using context of an image frame in a document are described herein. These search techniques are applicable to stock image searches as well as for other types of image databases. Typically, stock images are professional images that can be bought and sold through a digital marketplace on a royalty-free basis and under terms specified by the image owners. For instance, an image search tool can be provided to conduct searches using context of an image frame in conjunction with document creation and editing via various digital media applications.

The image search tool can be implemented as an integrated or add-in component of various types of applications including word processors, a web authoring tool (an example of which is Adobe Dreamweaver™), an HTML editor, a presentation application, or a web browser to name a few examples. The image search tool can also be implemented as a web application or image service that is accessible from a service provider over a network (examples of which Adobe Fotolia™ and Adobe Stock™).

In one or more implementations, a document can be created or edited using functionality exposed via a user interface for the digital media application. As part of this process, an image frame included within the document is detected, such as when the frame is inserted or selected. Then, content of the document in the vicinity of the image frame is analyzed to derive query terms corresponding to the content. The portion of content analyzed may correspond to an "active" portion of content in a document, such as a paragraph or section that is being edited, an image frame being inserted or to which focus is set, text under a heading associated with a current cursor position, and so forth. Additionally, the full text of an entire document can be employed for the analysis in some scenarios. This analysis may include recognition of named entities (e.g. proper names for people, geographic locations, business entities, brand names, and so forth) indicated by text that surrounds the image frame.

Tag elements are created for the query terms and exposed to enable selection of individual query terms to include as search parameters. By way of example, the tag elements may be implemented as selectable buttons that are placed within the image frame to provide a user with hints regarding suggested terms to use find relevant images for the image frame. A user can select and deselect terms to use for the search using corresponding tag elements to define and refine the image search.

Selection of one or more of the tag elements imitates an image search using query terms corresponding to the selected tag elements. For example, query terms and contextual information regarding the image frame may be passed to an image service configured to conduct the search and return matching image results. Images returned as results of the search are presented as an arrangement of candidate images for placement in the image frame. For example, thumbnails of matching images can be output via an image selection user interface that enables users to browse the results, view information for individual images such as the source and associated usage rights (e.g., attribution conditions, license terms, etc.), and select images to insert into the document. Previews of images as being inserted in the image frame can be exposed as part of the arrangement or responsive to interaction with individual images to show how the document would look with different images placed in the frame. Selection of a particular image from the arrangement causes insertion of the particular image into the image frame.

Techniques for image searches using context of an image frame as described in this document enable users who produce creative content to efficiently locate and utilize stock images (or other content) for their projects. In at least some cases, a search tool operates to automatically search for and suggest stock images for insertion into a document based on analysis of relevant text associated with an image frame. Accordingly, the searches can occur without a user having to provide input terms for the search. Further, image search results are exposed via an application user interface in real-time as a user creates content and can be updated dynamically during editing. Accordingly, if a user edits a document to include different content, image results are easily updated to correspond to the new content. Consequently, a user is able to focus on content creation and does not have to expend time and energy to manually locate stock images or provide input terms for the search.

In the following discussion, an example environment is first described that may employ the techniques described herein. Example procedures and implementation details are then described which may be performed in the example environment as well as other environments. Consequently, performance of the example procedures and details is not limited to the example environment and the example environment is not limited to performance of the examples procedures and details.

Example Environment

FIG. 1 is an illustration of an environment 100 in an example implementation that is operable to employ techniques described herein. The illustrated environment 100 includes a computing device 102 including a processing system 104 that may include one or more processing devices, one or more computer-readable storage media 106 and a client application module 108 embodied on the computer-readable storage media 106 and operable via the processing system 104 to implement corresponding functionality described herein. In at least some embodiments, the client application module 108 may represent a browser of the computing device operable to access various kinds of web-based resources (e.g., content and services). The client application module 108 may also represent a client-side component having integrated functionality operable to access web-based resources (e.g., a network-enabled application), browse the Internet, interact with online providers, and so forth.

The computing device 102 may also include or make use of an image search tool 110 that represents functionality operable to implement techniques for image searches as described above and below. For instance, the image search tool 110 is operable to access and utilize various available source of images to find candidate images that match query terms. The image search tool 110 further represents functionality to perform various actions to facilitate searches based on context of an image frame as discussed herein, such as analysis of content in the vicinity of an image frame, text analytics to derive query terms to use as search parameters, named entity recognition, and/or construction of queries, to name a few examples. In general, the image search tool 110 is configured to search for and suggest stock images for insertion into a document based on analysis of relevant content surrounding an image frame and without a user having to provide input terms for the search. Images that are discovered based on images searches conducted via the image search tool 110 may be exposed via a user interface 111 output by a client application module 108 or another application for which the image search tool 110 is configured to provide functionality for extrapolative stock image searches.

The image search tool 110 may be implemented as a software module, a hardware device, or using a combination of software, hardware, firmware, fixed logic circuitry, etc. The image search tool 110 may be implemented as a standalone component of the computing device 102 as illustrated. In addition or alternatively, the image search tool 110 may be configured as a component of the client application module 108, an operating system, or other device application. For example, image search tool 110 may be provided as a plug-in and/or downloadable script for a browser. The image search tool 110 may also represent script contained in or otherwise accessible via a webpage, web application, or other resources made available by a service provider.

The computing device 102 may be configured as any suitable type of computing device. For example, the computing device may be configured as a desktop computer, a laptop computer, a mobile device (e.g., assuming a handheld configuration such as a tablet or mobile phone), a tablet, and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices to perform operations "over the cloud" as further described in relation to FIG. 13.

The environment 100 further depicts one or more service providers 112, configured to communicate with computing device 102 over a network 114, such as the Internet, to provide a "cloud-based" computing environment. Generally, speaking a service provider 112 is configured to make various resources 116 available over the network 114 to clients. In some scenarios, users may sign-up for accounts that are employed to access corresponding resources from a provider. The provider may authenticate credentials of a user (e.g., username and password) before granting access to an account and corresponding resources 116. Other resources 116 may be made freely available, (e.g., without authentication or account-based access). The resources 116 can include any suitable combination of services and/or content typically made available over a network by one or more providers. Some examples of services include, but are not limited to, a photo editing service, a web development and management service, a collaboration service, a social networking service, a messaging service, an advertisement service, and so forth. Content may include various combinations of text, video, ads, audio, multi-media streams, animations, images, web documents, web pages, applications, device applications, and the like.

Web applications 118 represent one particular kind of resource 116 that may be accessible via a service provider 112. Web applications 118 may be operated over a network 114 using a browser or other client application module 108 to obtain and run client-side code for the web application. In at least some implementations, a runtime environment for execution of the web application 118 is provided by the browser (or other client application module 108). Thus, service and content available from the service provider may be accessible as web-applications in some scenarios.

The service provider is further illustrated as including an image service 120 that is configured to provide an image database 122 in accordance with techniques described herein. The image service 120 may operate to search different image sources 124 and analyze and curate images 126 that are available from the usage sources to produce the image database 122. The image database 122 is representative of a server-side repository of curated images that may accessed by clients to insert into web pages, word documents, presentations, and other content. The image service 120, for example, may be configured to provide clients/applications access to utilize the image database 122 via respective image search tools 110. By way of example, the image service 120 is depicted as implementing a search application programming interface (API) 128 though which clients/applications can provide search requests to define and initiate searches via the image service 120.

The image service 120 can also collect, associate, and manage usage right data for images 126, such as attribution conditions, license terms, usage fees, and other conditions associated with using images. Accordingly, images in the database can be sorted and filtered based on different usage rights and searches can specify particular rights of interest as search criteria. In this approach, the image service 120 handles searching across multiple sources on behalf of clients and produces a collection of pre-searched, curated, and sorted/filtered images that the clients can utilize for stock image selection. In addition or alternatively, image search tools 110 deployed to clients can be configured to interact directly with image sources 124 corresponding to multiple different providers to obtain images using extrapolative stock image search techniques discussed herein, with or without the assistance of the image service 120.

Having considered an example environment, consider now a discussion of some example details of techniques for extrapolative stock image searches in accordance with one or more implementations.

Image Search Using Image Frame Context

This section describes some example details of stock image searches that rely upon image frame context in accordance with one or more implementations. The details are discussed in relation to some example procedures, scenarios, and user interfaces of FIGS. 2-8. The procedures discussed herein are represented as sets of blocks that specify operations performed by one or more devices and are not necessarily limited to the orders shown for performing the operations by the respective blocks. Aspects of the procedures may be implemented in hardware, firmware, or software, or a combination thereof. Some aspects of the procedures may be implemented via one or more servers, such as via a service provider 112 that maintains and provides access to an image database 122 via an image service 120 or otherwise. Aspects of the procedures may also be performed by a suitably configured device, such as the example computing device 102 of FIG. 1 that includes or makes use of an image search tool 110 and/or a client application module 108.

In general, functionality, features, and concepts described in relation to the examples above and below may be employed in the context of the example procedures described in this document. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Figure 2:
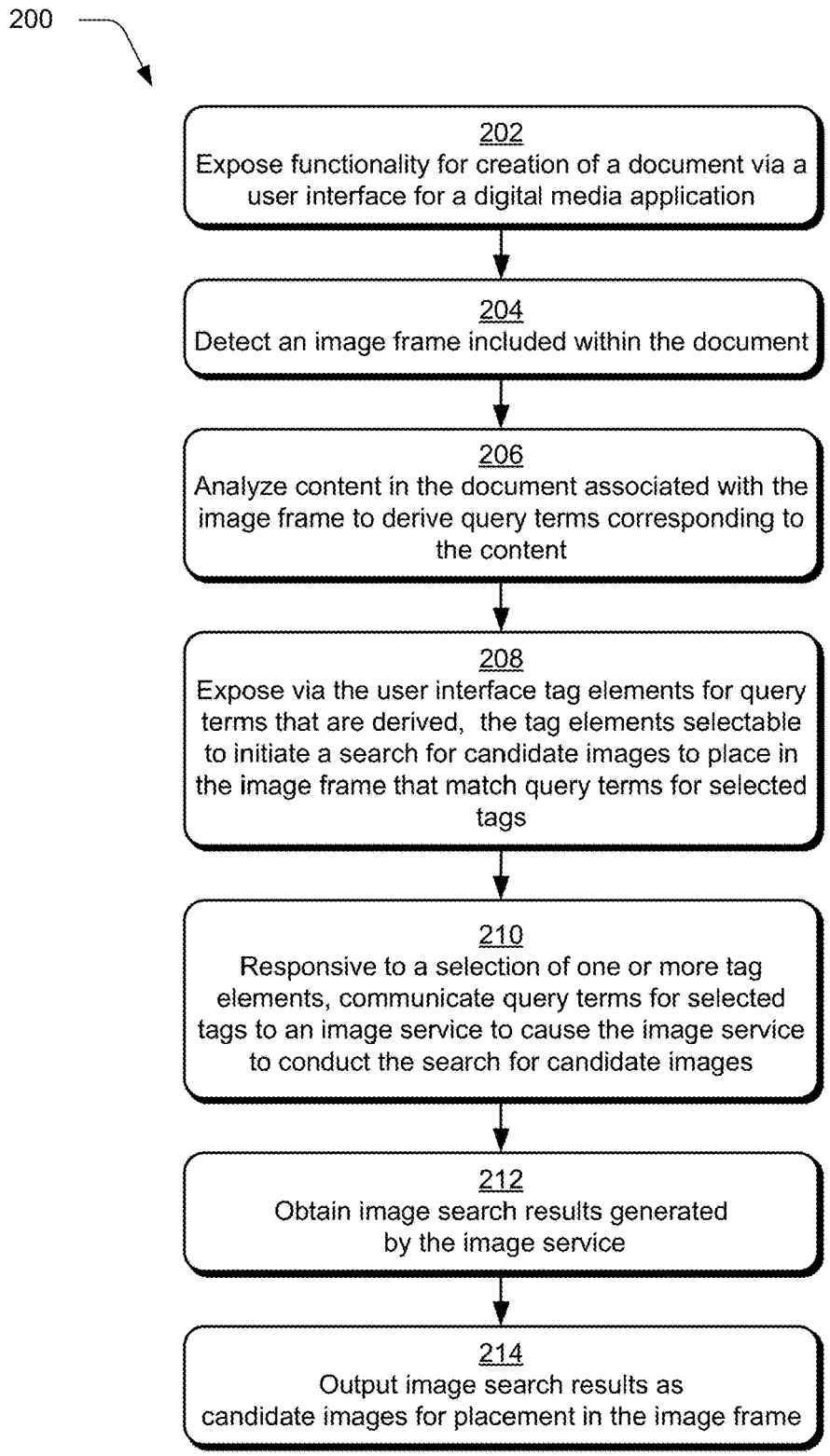
FIG. 2 is a flow diagram depicting an example procedure to search for images based on context of an image frame in accordance with one or more implementations.
Figure 5:
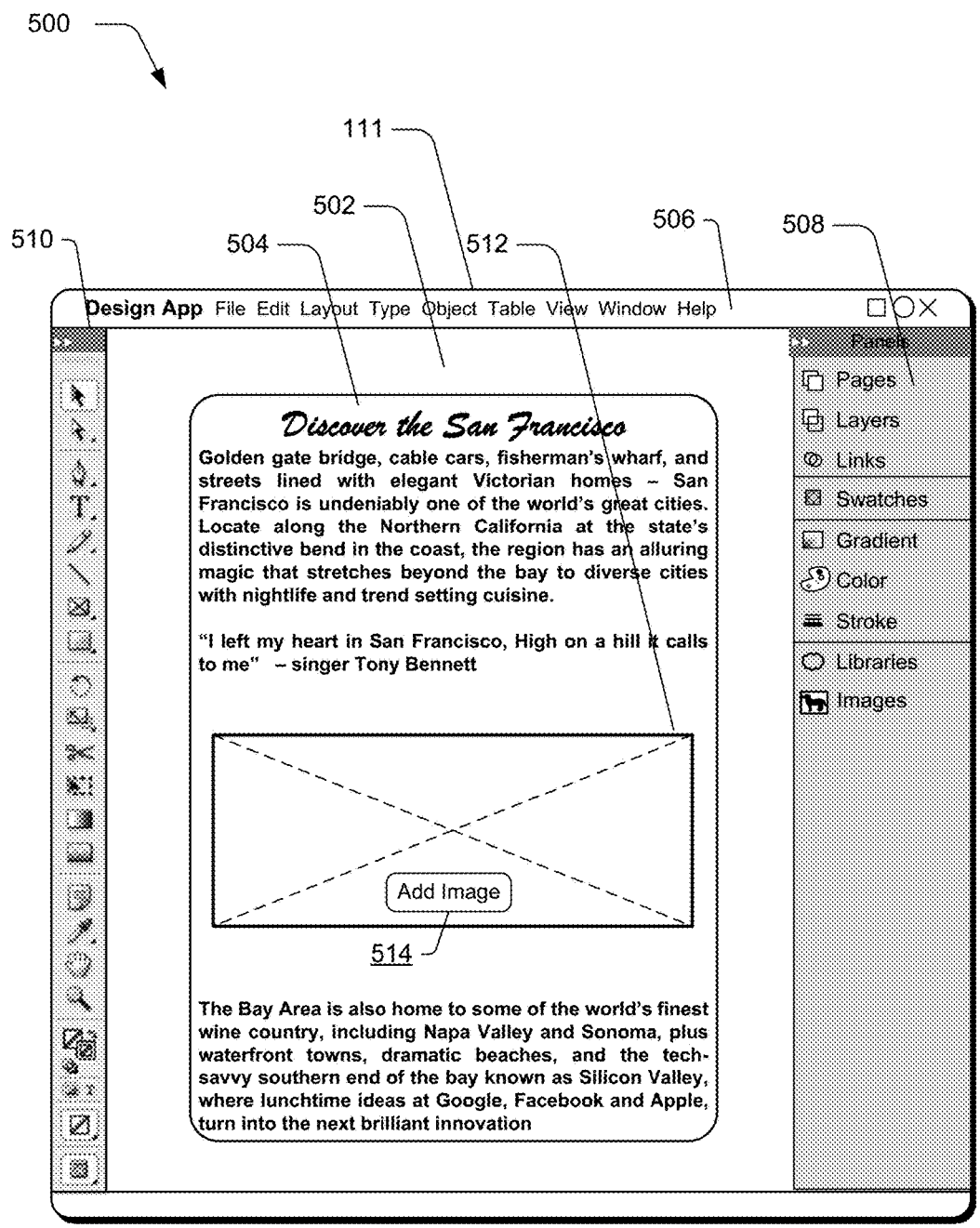
FIG. 5 is a diagram depicting an example user interface having functionality to facilitate image searches in connection with an image frame in accordance with one or more implementations.

FIG. 2 is a flow diagram depicting an example procedure 200 to search for images based on context of an image frame in accordance with one or more implementations. Functionality for creation of a document exposed via a user interface for a digital media application (block 202). As noted, image searches as described herein can occur in relation to editing of a document, such as a web page or word processing document. The techniques may be implemented via a search tool included with a digital media application that facilitates content creation. Various functionality to enable creation of content can be exposed via user interface for the digital media application. By way of example and not limitation, the functionality can include design tools to specify brush shapes, characters, colors, swatches, layers, etc.; menus having selectable items; links to templates and content building blocks; and other suitable controls. Creation of content includes originating the content as well as modifying existing content. FIG. 5 discussed in detail below shows an example implementation of a user interface for a digital media application that can be used to create content and implement image search techniques described herein.

As part of content creation, an image frame is detected that is included within the document (block 204). For instance, the image frame can be inserted as a placeholder element that is included in the content to provide a location at which an image can be inserted at a later time. Generally, the person creating the document looks to include images that are relevant to the content of the document. When initially inserted, the image frame may be blank. In an existing document that is being edited, the image frame can include an existing image. In one or more implementations, detection of the image frame is configured to trigger image search techniques described herein. The frame may be detected when the frame is inserted as part of creation of the document. Additionally, user interaction to add an image to a frame or change an existing image can be detected. For example, an image frame within an existing document that is loaded by the digital media application can be recognized responsive to operation of a control to modify an image contained in the image frame during editing of the existing document.

An image search tool 110 can be invoked to insert an image at a designated in relation to a detected image frame. Selection of a button, menu item, or other suitable control to add an image can initiate an image search in the manner discussed herein. In particular, the image search tool 110 can automatically perform the search based on analysis of content in the vicinity of an image frame and, at least in some cases, without a user having to input any search terms for the search.

To conduct a search, content in the document associated with the image frame is analyzed to derive query terms corresponding to the content (block 206). By way of example, text analysis to generate corresponding query terms can occur in relation to content in a portion of a document that is recognized as being associated with the location of the image frame. Recognition of relevant portions of a document may be based on a cursor position, an explicit selection of text, proximity to the image frame in the document, or other assessment of text that is in the vicinity of the image frame.

Once appropriate content corresponding to the image frame is identified, the text can be analyzed in various ways to derive a query terms. For example, the image search tool 110 can implement a tokenizer operable to parse the content into constituent words and fragments. Processing of the parsed content can be used to assess relevance of the terms and score different terms one to another based on factors such as a frequency of occurrence in the document, a usage history for the individual user, and known usage statistics across a collection of documents and users. In addition or alternatively, the analysis may involve recognition of named entities included in the content to use as query terms using an entity detection engine. Details regarding named entity recognition are discussed in relation to FIG. 3 below.

The analysis of content produces a set of query terms (e.g., keywords) that are extracted directly from content associated with the image frame. The query terms can be used to generate search queries to locate images that are relevant to the content. In an implementation, an image search tool 110 is configured to create such queries automatically and adapt the dynamically queries as content is being edited. The image search tool 110 can submit the queries and obtain corresponding search results without user intervention.

In addition or alternatively, the set of query terms can be used to provide hints to users regarding terms for a search to find images relevant to the content. In this approach, search queries are generated based on selection of individual query terms by a user.

In particular, tag elements for query terms that are derived are exposed via the user interface. The tag elements are selectable to initiate a search for candidate images to place the image frame that match query terms for selected tags (block 208). For example, tag elements can be configured as selectable text, buttons, or toggle controls that are shown within the user interface. The elements correspond to particular query terms and are labeled with the terms. The tag elements are selectable to designate one or more of the suggested query terms to include as parameters for the image search. Query terms corresponding to selected tag elements are included as parameters for the search and query terms for non-selected tag elements are not used for the search. Thus, the tag elements can be used to toggle back and forth between selection and deselection of query terms on an individual basis.

Figure 6:
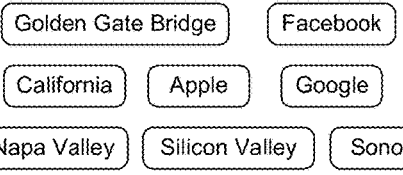
FIG. 6 is a diagram depicting an example document in which tag elements corresponding to query terms are exposed in accordance with one or more implementations.

By way of example, the tag elements can be displayed within the image frame of the document. In this case, the tag elements are rendered as selectable controls placed with the image frame. In another example, a separate tab or panel of a user interface can be used to display tag elements associated with an image frame (e.g., separate from the document and a panel/pane in which the document is displayed). In yet another approach, a pop-up element such as a window, message box, or bar can be configured to show the tag elements. FIG. 6 discussed in detail below shows one illustrative example implementation of tag elements.

Responsive to a selection of one or more tag elements, query terms for selected tags are communicated to an image service to cause the image service to conduct the search for candidate images (block 210). For example, an image search tool 110 can interact with an image service 120 via a search API 128 by the service. To initiate a search, the image search tool 110 can form a request that is passed to the image service via the API. The request defines the parameters for the search including at least the query terms that are for selected to use for the search. In particular, a query string that includes query terms for selected tags as search parameters is constructed and passed to the image service to request the search.

The parameters that are passed via the request can additionally include contextual information indicative of a context for the image frame. The context includes properties of the image frame such as the size, shape, and location of the frame. The context can also include document properties such as the content format, layout, color theme, and so forth. The image search tool 110 operates to determining a context associated with the image frame and communicate indications of the context along with the query terms to the image service as part of the request. The image service 120 is configured to search for images that match the query terms and the contextual information supplied in the search request and return relevant documents.

Image search results generated by the image service are obtained (block 212) and the image search results are output as candidate images for placement in the image frame (block 214). As discussed previously, an image search may involve accessing and searching images contained in an image database 122 exposed via an image service 120 accessible via a service provider 122. In addition or alternatively, the image search may involve searching images 126 across multiple different image sources 124.

Once image results matching the query terms and/or contextual information are obtained, the image results may be exposed in various ways to facilitate browsing, review, and selection of the images by user. A selected image can automatically be inserted into the image frame. By way of example, identified images may be exposed by outputting an image selection user interface having an arrangement of multiple images returned as search results for the image search. The image selection user interface may correspond to a client application module 108 used to create the content, examples of which were previously discussed.

Additionally, the user interface may include filter functionality operable to filter the arrangement of multiple images based on usage rights associated with the multiple images. This enable filtering and grouping of images in accordance with usage rights. Information regarding usage rights, image sources, and other metadata for the images may also be exposed along with the images in various ways, such as via a metadata element that is populated with data for a selected image, pop-up boxes accessible by placement of a cursor proximate to an image, or rendering of metadata along with the images via borders of the images. The user interface additionally includes functionality operable to select and automatically insert one of the multiple images to represent the text at a location within the content corresponding to the text. For example, a selection button or other control can be configured to add a selected image. Other selection techniques are also contemplated, such as by using a double-click, gesture, or other designated action to cause image insertion.

As noted, an image search tool 110 can be employed in conjunction with various different applications. The different applications may provide different levels of support for integration of image searches within the applications. The manner in which searches are conducted and results are exposed may occur in dependence upon the level of integration of the underlying applications.

For digital media application applications that provide integration of the image searches from directly within the application, functionality associated with the image search tool 110 can be exposed via portions of the application user interface, such as in panels, tabs, or pane. In this example, the image selection user interface having search results can be exposed directly within the application user interface via a corresponding panel, tab, or pane.

On the other hand, for digital media applications that do not provide direct integration, a separate application can be located to facilitate searching, viewing, and selection of images. For example, the image search tool 110 operates to recognize that the digital media application does not support display of the image search results directly and locate a separate application that does support display of the image search results. If available, the separate application is then launched to expose the image selection user interface.

The separate application may be configured as a client application module 108 that provides dedicated functionality for image searches. For instance the application may be a deployable client search application that is associated with the image service 120. Here, image results are presented within a user interface for the client search application. In the event that a client application to support functionality for image searches is not available, a browser can be launched to navigate to a web site associated with the image service 120 that supports browser-based functionality for image searches. In this case, image results are presented as a web page within a user interface for the browser. Thus, the image search tool 110 is configured to selectively decide whether to use the digital media application, client search application, or a browser for presentation of an image selection user interface as well as other aspects of the described techniques.

Figure 3:
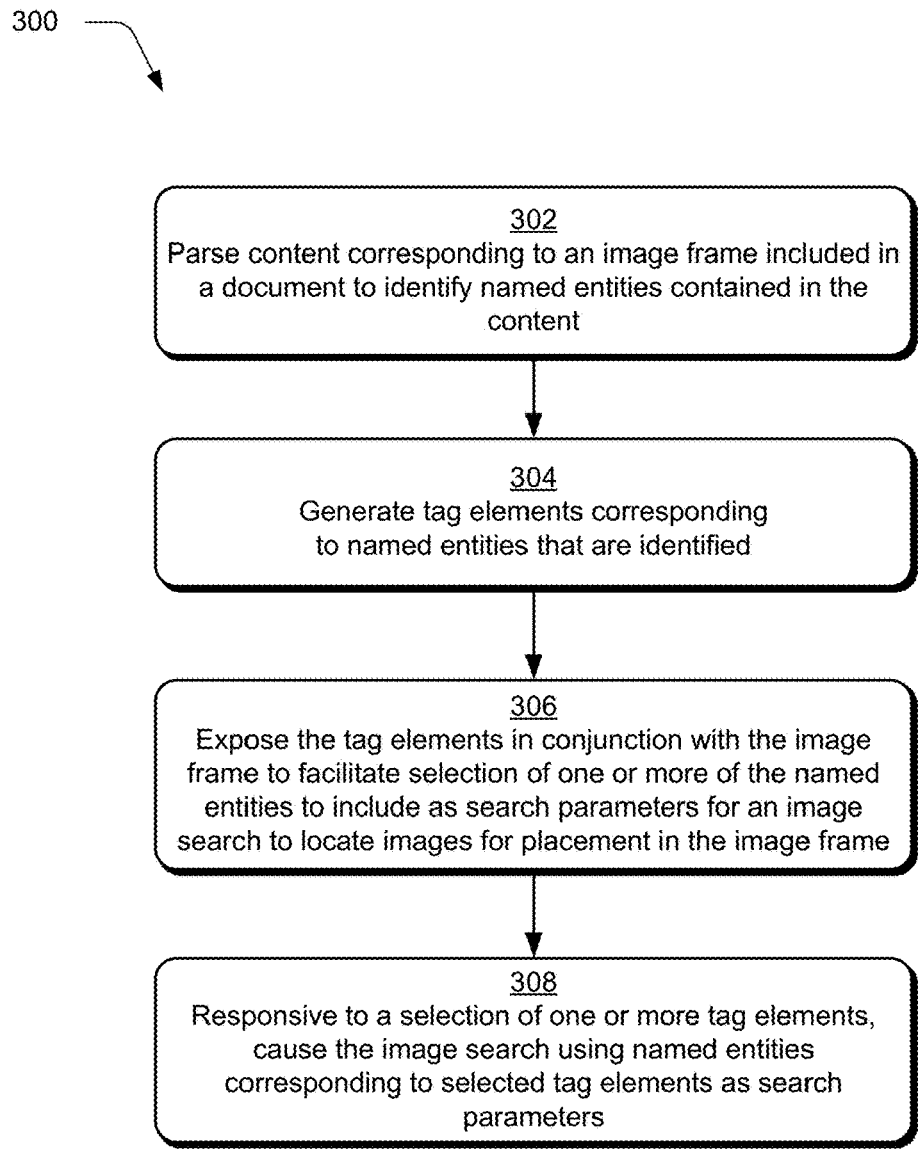
FIG. 3 is flow diagram depicting an example procedure for using named entities as search parameters in accordance with one or more implementations.

FIG. 3 is flow diagram depicting an example procedure 300 for using named entities as search parameters in accordance with one or more implementations. As noted, analysis of content surrounding an image frame can include a determination of named entities indicated by the content. Named entities extracted from the content can be selected as query parameters to use for a search via tag elements as previously described.

To do so, content corresponding to an image frame included in a document is parsed to identify named entities contained in the content (block 302). Processing of the content associated with a frame includes passing the content through an entity detection engine implemented by the image search tool. The entity detection engine is designed to recognize names of people, places, organizations, and so forth. In one or more implementations, named entities are recognized by breaking the content into parts of speech (POS) and identifying named entities for subjects and objects indicated by the parts of speech (POS). Accordingly, the entity detection engine can be invoked to process text in the document in the vicinity of the image frame to discover names of relevant entities that may be used as search parameters.

Tag elements corresponding to named entities that are identified are generated (block 304) and the tag elements are exposed in conjunction with the image frame to facilitate selection of one or more of the named entities to include as search parameters for an image search to locate images for placement in the image frame (block 306). For example, tag elements that correspond to named entities can be presented via user interface in various ways described above and below. Here, the tag elements enable a user to select a named entity or a combination of multiple entities to use as a basis for an image search. In an implementation, query terms are derived exclusively based on named entities that are extracted using named entity recognition. Alternatively, query terms can reflect a combination of named entities along with other terms generated from analysis of content surrounding a frame. Naturally, a search request can also include contextual information as previously noted to further refine the search.

Responsive to a selection of one or more tag elements, the image search is caused using named entities corresponding to selected tag elements as search parameters (block 308). As noted, this may occur by submitting a request to an image service 120 to initiate a search. In particular, the image search tool 110 operates to pass named entities corresponding to selected tag elements to the image service 120 as query parameters to cause the image search to conduct the image search. The image service conducts the search and image search results generated by the image service are provided as a response to the request. Upon obtaining the image search results, the image search tool 110 can output an image selection user interface having an arrangement of multiple images returned by the search as candidate images for placement in the image frame. Images search results can be configured in various ways examples of which are discussed above and below.

Figure 4:
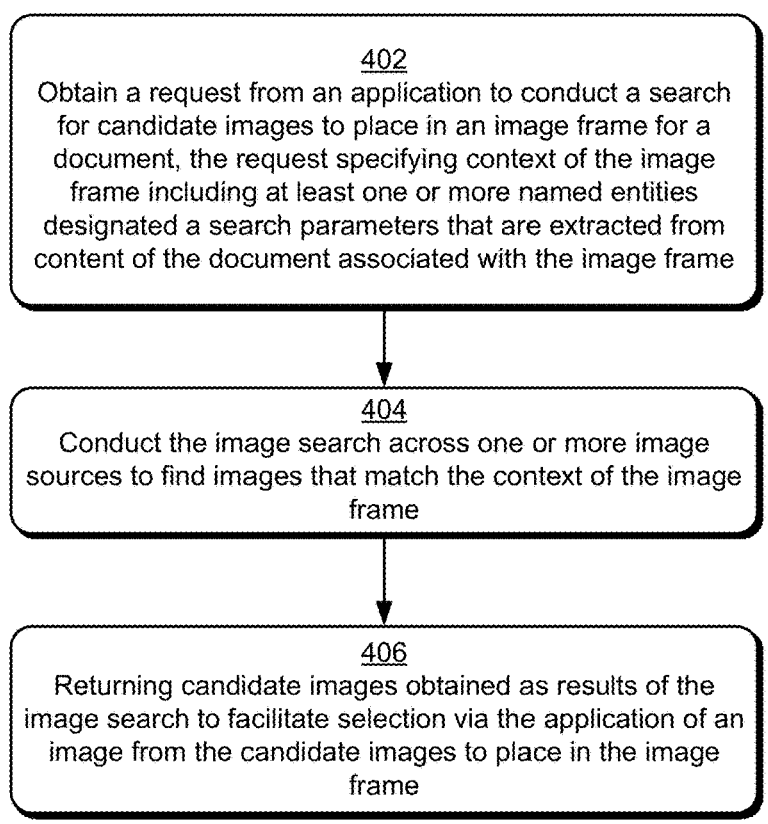
FIG. 4 is flow diagram depicting an example procedure in which an image service performs a search based on context of an image frame accordance with one or more implementations.

FIG. 4 is flow diagram depicting an example procedure 400 in which an image service performs a search based on context of an image frame accordance with one or more implementations. In particular, procedure 400 represents example operations related to image searches that may be performed via an image service 120 and/or search API exposed by the image service 120. In particular, the image search is based on contextual information associated with an image frame in the document that is passed to the service along with a search request.

A request is obtained from an application to conduct a search for candidate images to place in an image frame for a document. The request specifies context of the image frame including at least one or more named entities designated a search parameters that are extracted from content of the document associated with the image frame (block 402). For example, a search request communicated from a client for handling by an image service 120 can be configured to include one or more named entities as search parameters as discussed previously. Named entities can be determined in the manner previously described and incorporated into a search request. The request can also include contextual information indicative of a context for the image frame. The context includes properties of the image frame such as the size, shape, and location of the frame. The context can also include document properties such as the content format, layout, color theme, and so forth.

The image search is conducted across one or more image sources to find images that match the context of the image frame (block 404). In particular, an image service 120 can conduct a search of images contained in an image database 122 and/or across multiple different image sources 124. The image search is conducted to find images that match the context indicated in the request including the name entities and properties of the frame and document (e.g., size, shape, theme, layout, etc.) as search parameters. Then, candidate images obtained as results of the image search are returned to facilitate selection via the application of an image from the candidate images to place in the image frame (block 406). In an implementation, the image service can pre-format image to correspond to contextual parameters. By way of example and not limitation, the image service can pre-format candidate images to match a color theme for the document and the shape of the image frame. In this way, image results returned to a client already match properties of the document, which makes it easy for a content creator to add an image to the document without having to perform additional operations (e.g., recolor, resize, crop, etc.) to make the image suitable for inclusion in the document.

Having considered the example procedures of FIGS. 2-4, consider now the following user interfaces examples of FIGS. 5-8 that further illustrative various aspects of the techniques discussed in relation to the example procedures/

FIG. 5 is a diagram depicting generally at 500 an example user interface having functionality to facilitate image searches in connection with an image frame in accordance with one or more implementations. The depicted user interface 111 corresponds to a digital media application that provides various functionality to create and edit content for a document, such as a web page, presentation, report or other project. The user interface 111 includes a viewing pane 502 in which a document 504 is exposed for editing. Various functionality can be provided for content creation via the interface in dependence on the type of application and document. Example functionality represented in FIG. 5 includes menu bar items 506, a panel 508 having navigation links and shortcuts to different locations and tools, and a tool bar 510 that exposes various tools related to content creation. In accordance with techniques discussed herein, the document includes an image frame 512, which is inserted within content of the document. Here, the content is in the form of an article discussing San Francisco. The image frame 512 is represented as a placeholder frame that does not currently contain an image.

Techniques discussed in this document can be employed to efficiently search for and add a selected image into the example image frame 512. As noted the image search is based on analysis of content corresponding to the image frame 512. The content that is selected for analysis is generally located in the vicinity of the image frame 512. For example, the system can utilize text of a paragraph surrounding the frame or alternatively text in paragraphs above and below the frame. In another example, content in the same section or under the same heading as the image frame is selected for analysis. Another approach is to use text on the same page as the frame. Content to utilize as part of the search can also be based on a cursor position or explicit selection of content by a user. Processing to initiate an image search can occur automatically responsive to insertion of an image frame. In addition or alternatively, the image search can be initiated by selection of a control to add or change an image in a frame, an example of which is the add image control 514 represented in FIG. 5.

When an image search is initiated, selected content is analyzed to determine query terms that can be used to suggest search parameters and conduct the search (e.g., based on selected terms) in the manner described previously. To illustrate, consider FIG. 6, which depicts generally at 600 a diagram of an example document in which tag elements corresponding to query terms are exposed in accordance with one or more implementations. In particular, FIG. 6 illustrates tag elements 602 that are generated and exposed for the example document 504 of FIG. 5 based on processing of content associated with the image frame. For instance, when the add image control 514 of FIG. 5 is selected or a search is otherwise initiated, the text surrounding the image frame 512 is processed to derive query terms to use for an image search. In the depicted example, the analysis uses named entity detection to recognize named entities contained in the content. The example tag elements 602 in FIG. 6 correspond to the recognized named entities such as "Golden Gate Bridge", "Apple", "California," and "Napa Valley". In the illustrated example, the tag elements are configured as selectable controls that are labeled with corresponding names and rendered within the image frame 512. Other configurations and locations for tag elements are also contemplated, such as using a dedicated panel, a pop-up element, or a bar to provide the tag elements.

As noted, tag elements provide hints regarding possible query terms that can be used to define and image search. One or a combination of tag elements can be selected to launch a search based on corresponding query terms and/or named entities. When tags are selected, the search is performed and results of the search are presented via an image selection user interface that can be output via a portion of the user interface 111 or by launching a separate application if display of the results is not supported by the user interface 111. To illustrate, consider now FIG. 7, which depicts generally at 700 an example user interface in which image results corresponding to selected query terms are exposed in accordance with one or more implementations. In this example, a selection 702 of a tag element corresponding to the named entity "Golden Gate Bridge" is represented. Selection of the tag element causes an image search to find images that match the selected term. Additionally, contextual parameters such as the shape of the image frame (e.g., rectangular in this case) and a color theme for the document 504 can be passed along with query parameters, in which case the image search is conducted to find images that match both the contextual parameters and the query parameters.

Figure 7:
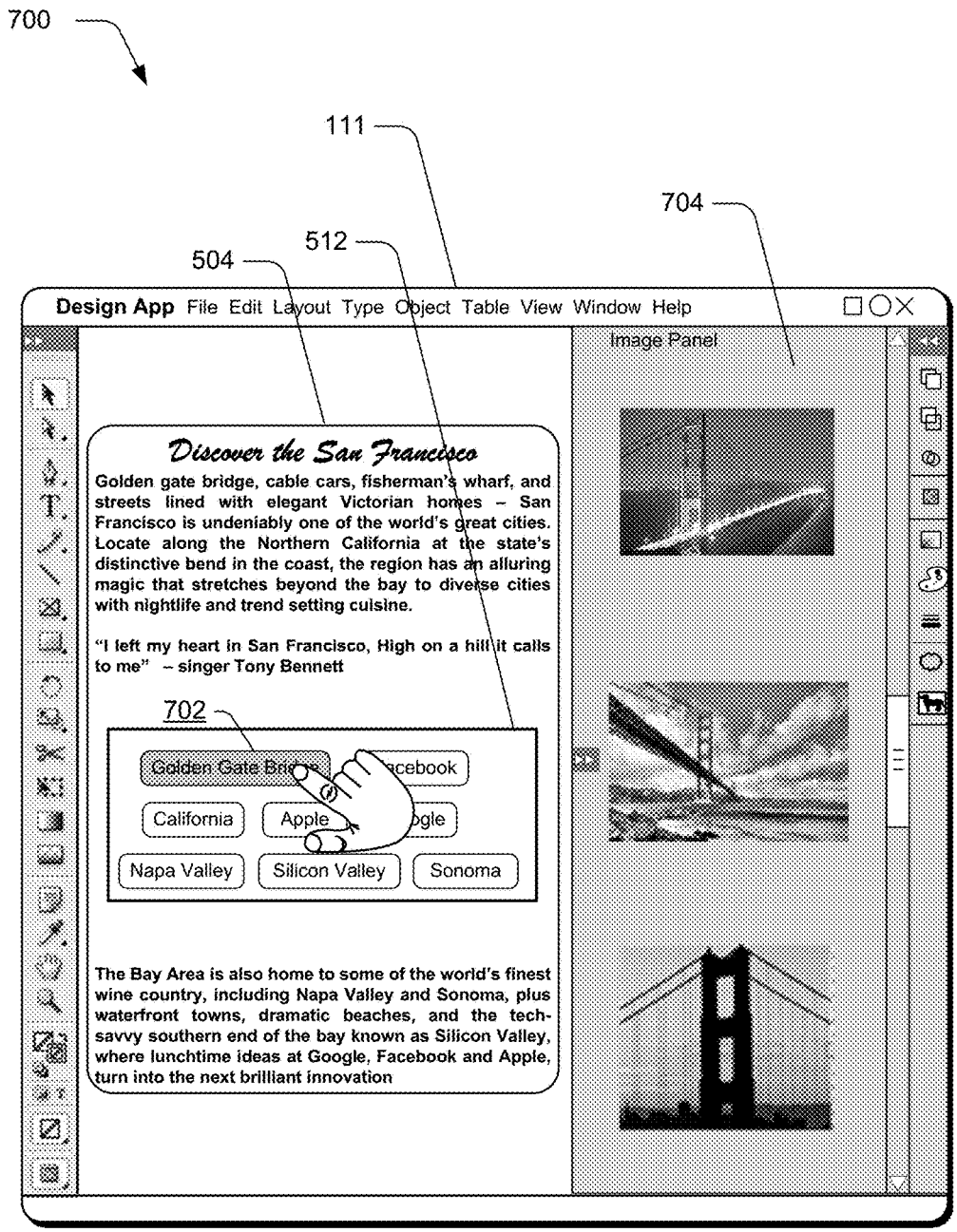
FIG. 7 is a diagram depicting an example user interface in which image results corresponding to selected query terms are exposed in accordance with one or more implementations.

In the example of FIG. 7, an image selection user interface is presented via an image panel 704 that is exposed in the user interface. The image panel 704 includes an arrangement of multiple images that are returned as results of the search. In particular, thumbnail images of the Golden Gate Bridge are presented in the image panel 704. A user can navigate the arrangement to view different candidate images and find an image to insert into the image frame. In an implementation, selection of a thumbnail image causes insertion of the corresponding image into the frame. The image panel 704 may also include functionality to filter, group, and organize the image according to different characteristics to facilitate navigation and selection of an appropriate image for inclusion in the document. If a user changes the selected tag element(s), the results in the image panel are dynamically updated accordingly. Thus, a user is able to easily initiate an image search from within a digital media application, refine the search, and insert an image into an image frame in a document the user is working on.

Figure 8:
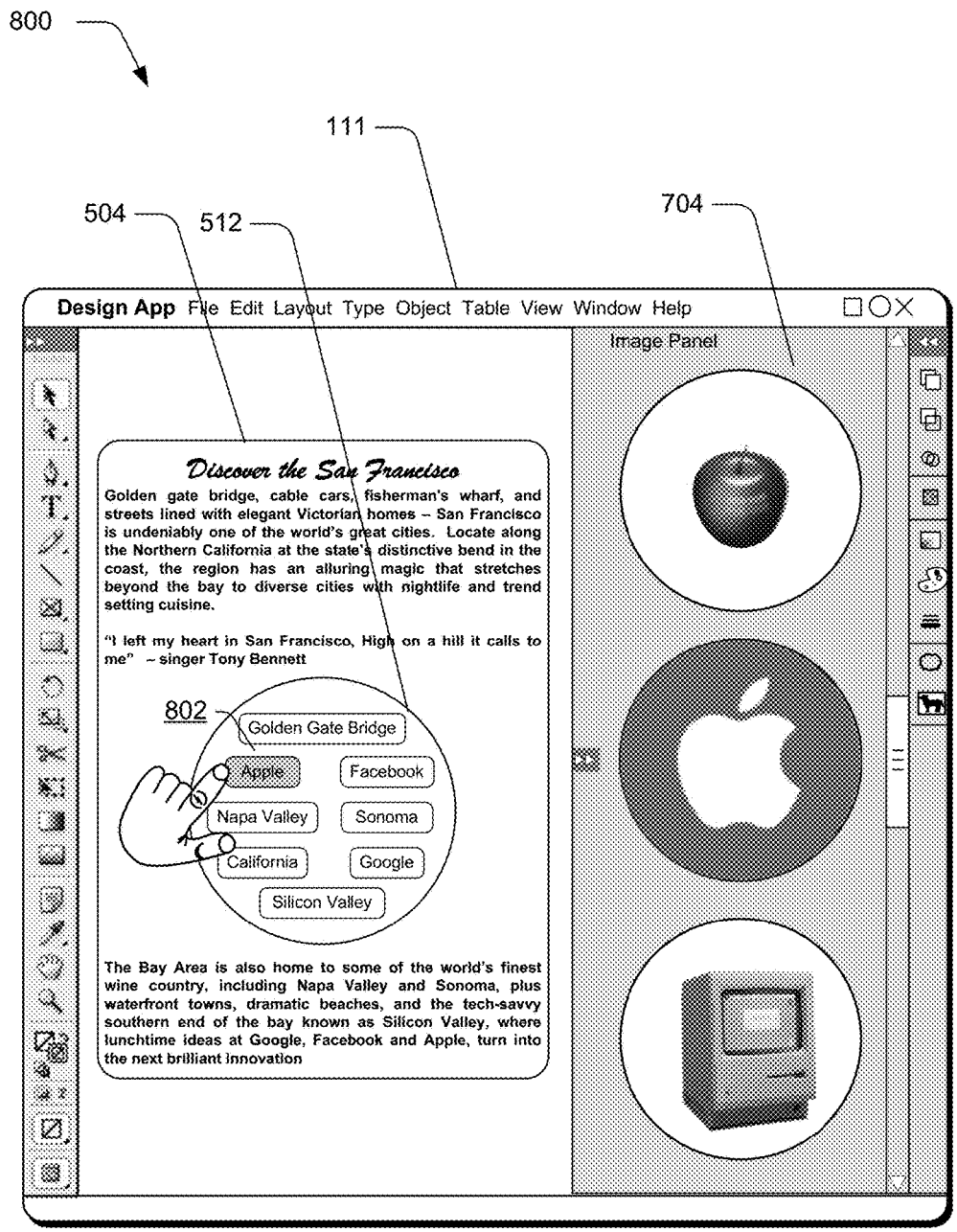
FIG. 8 is a diagram depicting an example user interface in which image results that match context associated with an image frame are exposed in accordance with one or more implementations.

FIG. 8 is a diagram depicting generally at 800 an example user interface in which image results that match context associated with an image frame are exposed in accordance with one or more implementations. The example of FIG. 8 is similar to the example of FIG. 7 except that in this case the image frame 512 has a circular shape and the tag element corresponding to the named entity "Apple" is selected instead of "Golden Gate Bridge." The example of FIG. 8 further illustrates that search results can be formatted to match contextual properties. In particular, image results for "Apple" shown in the image panel 704 are represented as having the circular shape and the same size as the image frame for which the images are candidates. Additionally, the images can be configured to match a color theme and/or other properties (texture, effects, styles, etc.) of the document. Matching the contextual properties enables a content creator to instantly get a sense of how different images might appear if inserted in the frame, which makes the process of selecting an image faster and more accurate. In addition to matching contextual properties, various techniques can be employed to facilitate live previews of candidate images as they would appear within an image frame, details of which are discussed in the following section in relation to FIGS. 9-12.

Previews for Contextual Image Searches

This section describes example details of techniques to provide previews in connection with stock image searches that rely upon image frame context in accordance with one or more implementations. Previews as described herein can be used in combination with the example devices, components, and procedures described above in relation to FIGS. 1-8. In particular, once search results having candidate images for an image frame are obtained using techniques described in this document, a user is able to access previews of how different images might look when included in the document. The previews can assist a user in selecting images and if applicable deciding whether purchase images that are offered for sale. Details regarding various techniques to implement previews are discussed in relation to the example procedure of FIG. 9 and example user interface of FIGS. 10-12.

FIG. 9 is flow diagram depicting an example procedure 900 in which previews of images returned as results of a search as being inserted in the image frame are exposed. Search results are output via a user interface for a digital media application image that include candidate images for insertion in an image frame placed in a document exposed for editing in the user interface (block 902). Image search results corresponding to an image frame can be obtained using various techniques described in this document. For instance, an image search may be based on analysis of content in the vicinity of image frame relevant to derive relevant query terms. Some or all of the query terms may correspond to named entities. Possible query terms derived via the analysis of content can be exposed for selection by a user using tag elements or comparable controls. A search query is then formed based on selected terms and employed to initiate the search via search service. In addition to passing query terms to the service, contextual information regarding the image frame and document can be used to determine and provide additional parameters to use for the search. The search service conducts the search and returns relevant images that match the query parameters and/or contextual parameters. Image search results may then be presented in various ways to enable viewing and selection of then images, such as via suitably configured image selection user interface, examples of which are discussed above and below.

Navigation interaction is detected that corresponds to a particular image of the candidate images (block 904). Various kinds of input to select a particular image within an arrangement candidate images are contemplated. Generally, the input includes different kinds of navigation interaction to manipulate and interact with an arrangement of multiple images that are returned as result of a search. The input is used to identify a particular image without fully selecting the image. In other words, the input does not constitute a selection of the designated image for insertion in the image frame. Rather, the input represents interaction effective to trigger a preview in which the particular image is shown within the image frame of the document.

By way of example, input sufficient to trigger a preview may involve navigation interaction to position a cursor proximate to the particular image in the arrangement. In this example, the cursor is "hovered" over or near to the image to effectuate a hover selection of the particular image within an arrangement of the image search results. In another example, input involves interaction to position the image at a particular location in the arrangement, such as through scrolling, panning, zooming, searching or other navigational actions. In this approach, positioning of an image at a defined focus location is sufficient interaction to trigger a preview. The defined focus location may correspond to a central position in a scrollable display of images, a position at the top of a viewing pane through which results are made accessible, or other designated position in an arrangement of images. Various other examples of input sufficient to trigger a preview are also contemplated, such as swiping or another a defined touch gesture, selection of a preview button or other control, or using a keystroke or voice command to trigger the preview, to name a few examples.

Then, a preview of the document as the document would appear if the particular image is inserted into the image frame is generated responsive to detection of the navigation interaction (block 906) and the user interface is configured to provide access to the preview of the document (block 908). A variety of different techniques and user interface configurations to provide previews for one or multiple images are contemplated. For example, previews can be provided in-place within the image frame of a document that is exposed for editing, such as the document 504 exposed within the viewing pane 502 in the example of FIG. 5. In this example, configuring the user interface involves rendering a view of a particular image in the image frame in-place within the document as exposed in the user interface. For instance, the preview may replace a view of the document exposed for editing in the editing panel for as long as the input to select the particular image is maintained. In another approach, preview images can be shown using a portion of the user interface separate from the document/viewing pane, such as by using a dedicated preview panel or tab for previews that is exposed in the user interface. In this case, the preview is presented as an element separate from the document exposed for editing.

In addition or alternatively, previews can be exposed in-line with image search results presented as displayed via an image selection user interface. In this example, preview images can be selectively shown by exposing a thumbnail image of the document itself around a particular image result in the arrangement of results. The thumbnail image of the document is configured to show the particular image result in the position of the image frame. It is noted that such inline previews can be presented in response to navigation interaction triggers for individual images at different times in the manner previously discussed. In addition or alternatively, the image selection user interface may be configured to present each image in the search results in a preview format. Thus, an image panel or separate tab can be configured to provide a preview for each image at the same time, which simplifies the preview process for a user since the user does not have to provide navigation interaction to launch previews on an individual basis. A preview mode in which search results are shown using the preview format may be launched according to a default setting or user preferences. Additionally, a toggle control can be provided that enables a user selection to turn the preview mode with preview format on or off as desired. Further, an image selection user interface may include functionality to switch between different kinds of previews, such as controls or settings operable to select and switch between previews of images shown in-place on an individual basis within a document, previews presented in-line on an individual basis, or previews in which a preview mode is activated to show previews for each item at the same time.

When navigation interaction is used as a mechanism to trigger previews, a preview that is generated and exposed may persist as long as the navigation interaction persists. For instance, if hovering is used to launch a preview, the preview is presented in the user interface as long as a user continues to hover the cursor over a corresponding image. When the user take subsequent action to conclude the interaction with a particular image, conclusion of the navigation interaction corresponding to the particular image is recognized and the user interface can be updated accordingly to remove access to the preview. For example, if user moves the cursor away from the particular image, this movement is recognized and a corresponding preview can appear to fade out and/or disappear. If the user subsequently interacts with a different image, additional navigation interaction corresponding to the different image of the candidate images is detected. In response the preview is reconfigured to switch to a view of the document as the document would appear if the different image is inserted into the image frame. In this way, a user can interact with different images presented in an arrangement of search results to access and switch between preview representations of the different images in connection with an image frame in a document.

Figure 10:
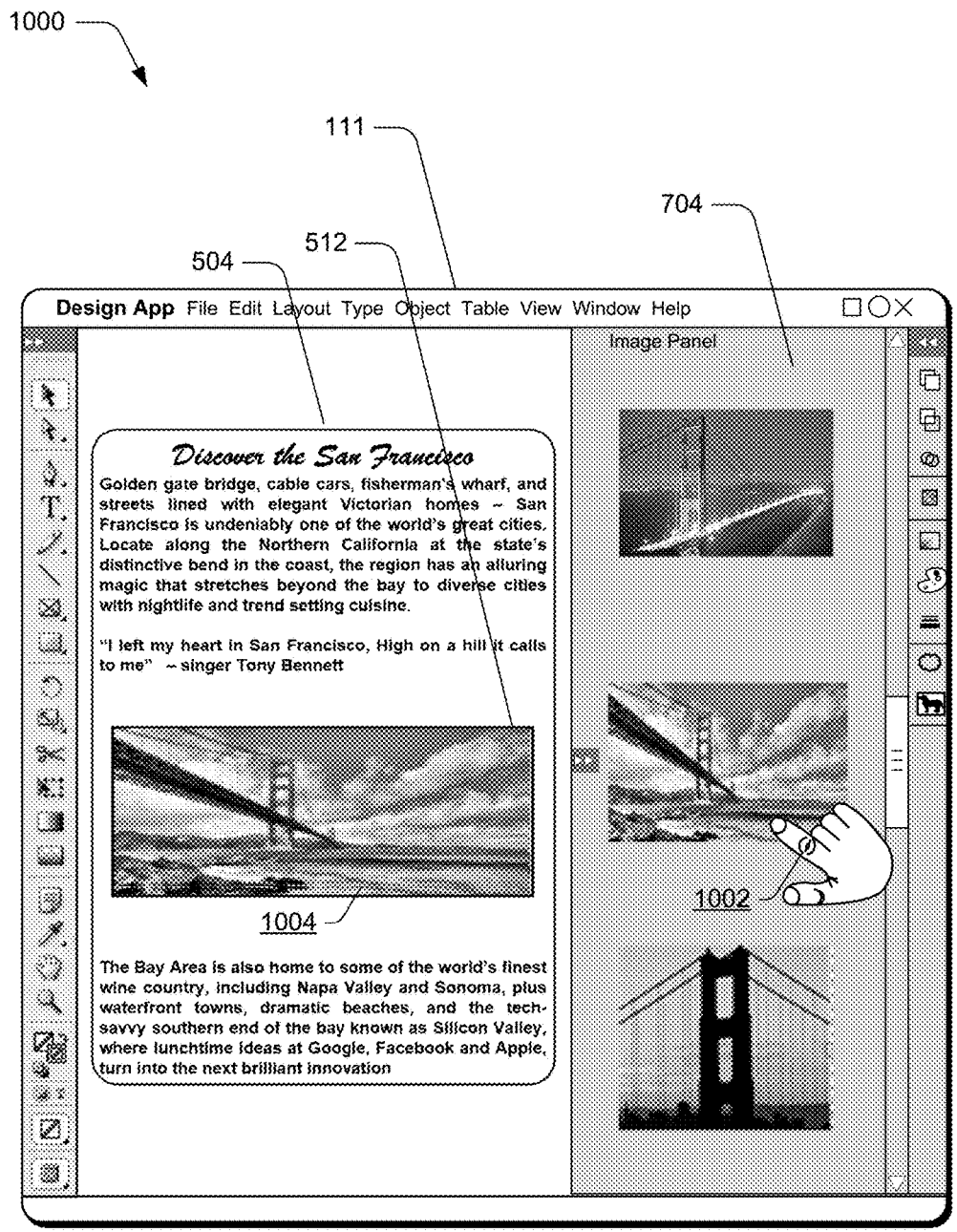
FIG. 10 is a diagram depicting an example user interface in which a preview of a selected image is shown in accordance with one or more implementations.
Figure 11:
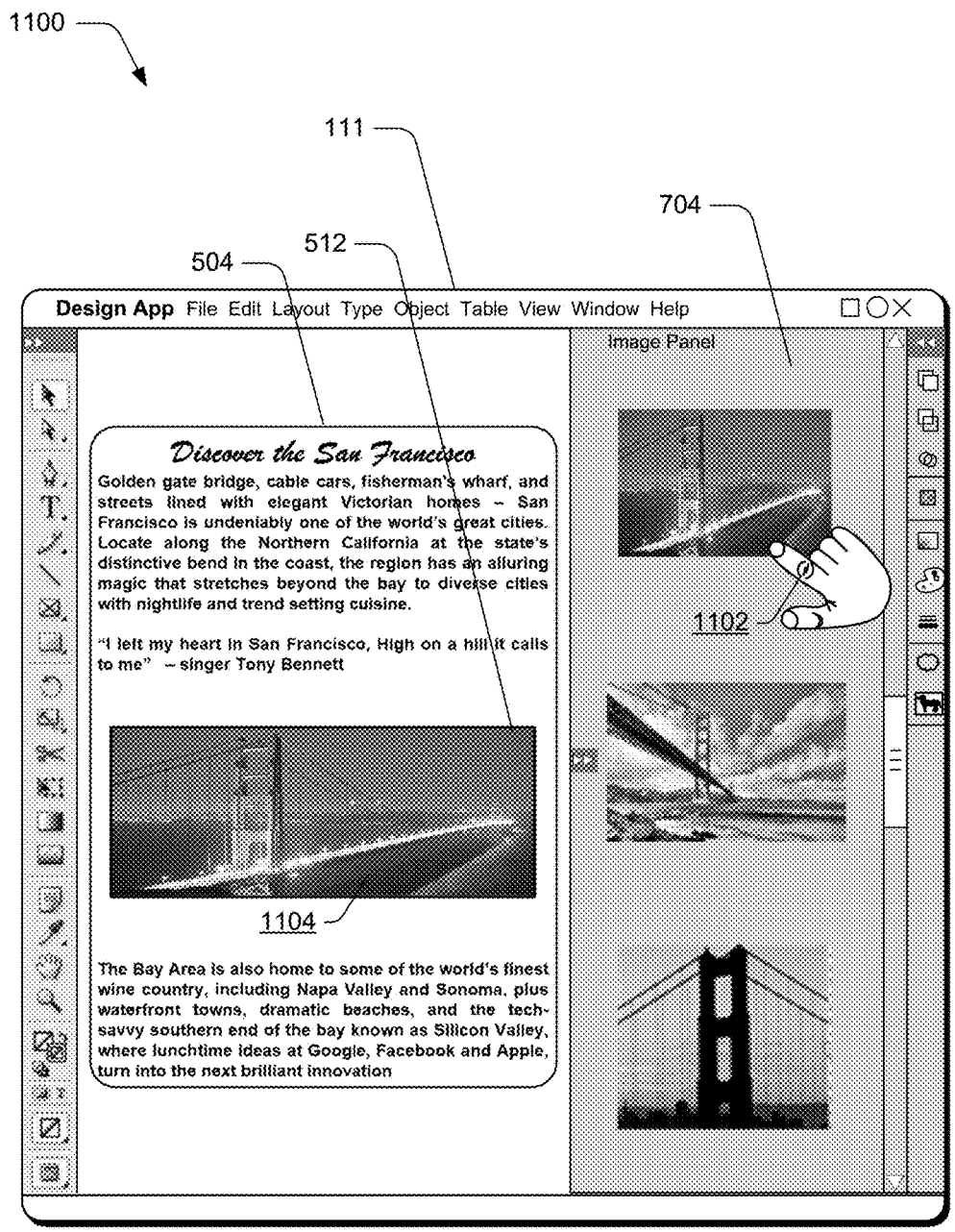
FIG. 11 is a diagram depicting an example user interface in which a preview of a different selected image is shown in accordance with one or more implementations.
Figure 12:
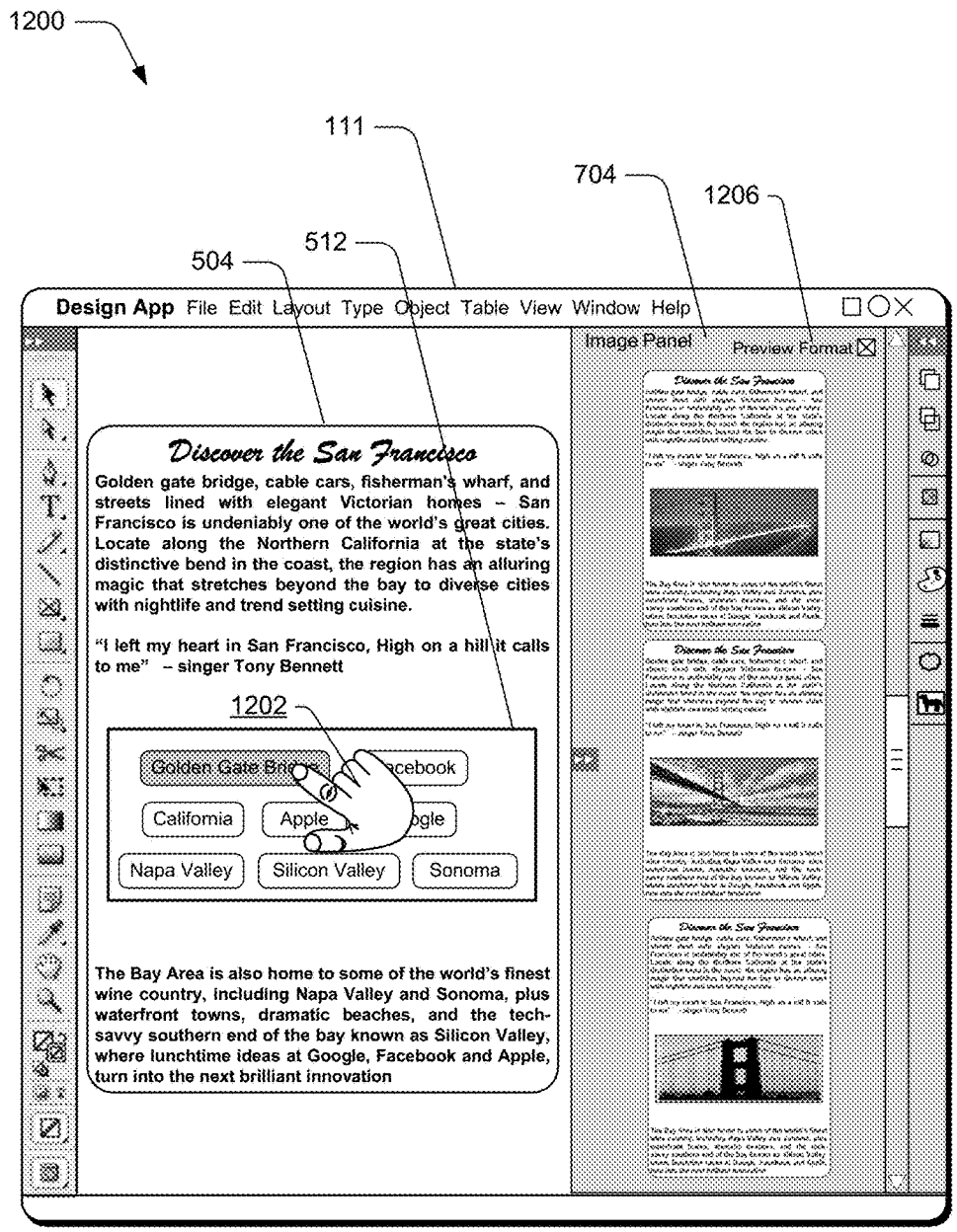
FIG. 12 is a diagram depicting an example user interface in which previews of multiple images are shown as part of an arrangement of search results in accordance with one or more implementations.

To further illustrate aspects of previews for image searches that rely upon image frame context, consider example user interfaces depicted in FIGS. 10 to 12. FIG. 10 is a diagram depicting generally at 1000 an example user interface in which a preview of a selected image is shown in accordance with one or more implementations. In particular, FIG. 10 represents previewing that occurs in-place within an exposed document responsive to navigation interaction with an image. Consider, for instance, image results that are exposed in image panel 704 as thumbnail images of the Golden Gate Bridge as discussed in relation to FIG. 7. A user is able to access the image results via the image panel 704 to view and select the image. A user can also provide appropriate navigation interaction to trigger a preview in the manner discussed in relation to FIG. 9. By way of example, FIG. 10 represents navigation interaction in the form of touch input 1002 to position a cursor and/or hover over a particular one of the images in image panel 704. As represented in FIG. 10, this cause a preview 1004 of the particular image to appear in-place within the image frame 512 of the document 504. The preview 1004 can be shown as long as the cursor position remains over the particular image. When the navigation interaction concludes, the preview 1004 may disappear and the view of the document 504 can revert back to the view depicted in FIG. 7, which does not include a preview in the image frame 512.

When a user provide further navigation interaction to interact with a different image, a corresponding preview for the different image can be shown. This scenario is represented by FIG. 11. In particular, FIG. 11 is a diagram depicting generally at 1100 an example user interface in which a preview of a different selected image is shown in accordance with one or more implementations. As with FIG. 10, FIG. 11 represents navigation interaction in the form of touch input 1104 to position a cursor and/or hover over a particular one of the images in image panel 704, which in this case is a different image than the image previewed in the example of FIG. 10. Here, the navigation interaction causes a preview 1104 of the different image to appear in-place within the image frame 512 of the document 504. Thus, interaction with different images in an arrangement of image search results can be employed to launch previews for different images at different times as represented by FIGS. 10 and 11.

As noted previously, previews may alternatively be shown outside of the document by using a separate portion of the user interface (e.g., tab or panel) or in-line within an arrangement of image search results. In these cases, previews for multiple items may be shown at the same time. An example in which previews are exposed in-line with search results is depicted and discussed in relation to FIG. 12. In particular, FIG. 12 is a diagram depicting generally at 1200 an example user interface in which previews of multiple images are shown as part of an arrangement of search results in accordance with one or more implementations. In the example of FIG. 12, the image panel 704 is configured to show each image in the results using a preview mode in which the images are displayed in a preview format. As depicted, in the preview format a thumbnail of the document is rendered to surround each image such that the image appears as though the image is inserted into the image frame 512 of the document 504. To do so a thumbnail image of the document is combined with each image of the results. This provides a simultaneous view of previews for multiple candidate images. Although, the previews are illustrated as being provided via the image panel 704, comparable previews for multiple items can be implemented via a different panel or via a separate tab designed to show such previews.

FIG. 12 further includes a toggle control 1206 that represents functionality to turn the preview mode with preview formats on or off In this case, the toggle control 1206 is in the form of a selectable checkbox. Here, the checkbox is selected, which cause results to appear in the preview format as illustrated. A user can deselect the checkbox to exit the preview mode, in which case the user interface can be reconfigured to revert back to the view as in the example of FIG. 7 having images search results shown as images (e.g., thumbnails) and without the previews. Accordingly, a toggle control 1206 enables the user to selectively switch back and forth between a preview mode having images in a preview format and a "normal" mode that does show images in preview format.

Having considered the forgoing example details, procedures, user interfaces and example, consider now a discussion of an example system including various components and devices that can be employed for one or more implementations of image search techniques described herein.

Example System and Device

Figure 13:
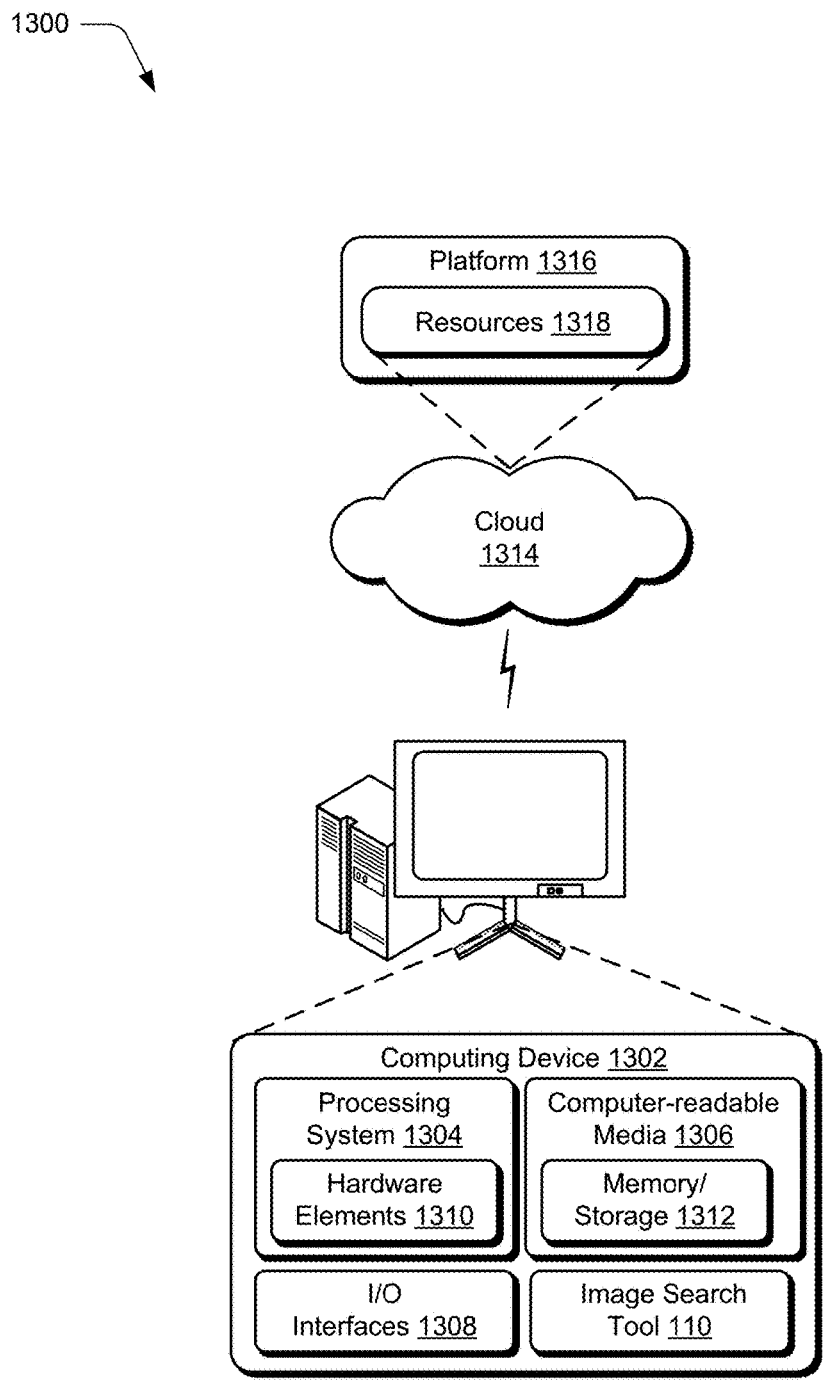
FIG. 13 illustrates an example system including various components of an example device that can be employed for one or more implementations of image search techniques described herein.

FIG. 13 illustrates an example system generally at 1300 that includes an example computing device 1302 that is representative of one or more computing systems and/or devices that may implement the various techniques described herein. This is illustrated through inclusion of the image search tool 110, which operates as described above. The computing device 1302 may be, for example, a server of a service provider, a device associated with a client (e.g., a client device), an on-chip system, and/or any other suitable computing device or computing system.

The example computing device 1302 is illustrated as including a processing system 1304, one or more computer-readable media 1306, and one or more I/O interface 1308 that are communicatively coupled, one to another. Although not shown, the computing device 1302 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1304 is representative of functionality to perform one or more operations using hardware. Accordingly, the processing system 1304 is illustrated as including hardware elements 1310 that may be configured as processors, functional blocks, and so forth. This may include implementation in hardware as an application specific integrated circuit or other logic device formed using one or more semiconductors. The hardware elements 1310 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1306 is illustrated as including memory/storage 1312. The memory/storage 1312 represents memory/storage capacity associated with one or more computer-readable media. The memory/storage component 1312 may include volatile media (such as random access memory (RAM)) and/or nonvolatile media (such as read only memory (ROM), Flash memory, optical disks, magnetic disks, and so forth). The memory/storage component 1312 may include fixed media (e.g., RAM, ROM, a fixed hard drive, and so on) as well as removable media (e.g., Flash memory, a removable hard drive, an optical disc, and so forth). The computer-readable media 1306 may be configured in a variety of other ways as further described below.

Input/output interface(s) 1308 are representative of functionality to allow a user to enter commands and information to computing device 1302, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1302 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1302. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 1302, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1310 and computer-readable media 1306 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1310. The computing device 1302 may be configured to implement particular instructions and/or functions corresponding to the software and/or hardware modules. Accordingly, implementation of a module that is executable by the computing device 1302 as software may be achieved at least partially in hardware, e.g., through use of computer-readable storage media and/or hardware elements 1310 of the processing system 1304. The instructions and/or functions may be executable/operable by one or more articles of manufacture (for example, one or more computing devices 1302 and/or processing systems 1304) to implement techniques, modules, and examples described herein.

The techniques described herein may be supported by various configurations of the computing device 1302 and are not limited to the specific examples of the techniques described herein. This functionality may also be implemented all or in part through use of a distributed system, such as over a "cloud" 1314 via a platform 1316 as described below.

The cloud 1314 includes and/or is representative of a platform 1316 for resources 1318. The platform 1316 abstracts underlying functionality of hardware (e.g., servers) and software resources of the cloud 1314. The resources 1318 may include applications and/or data that can be utilized while computer processing is executed on servers that are remote from the computing device 1302. Resources 1318 can also include services provided over the Internet and/or through a subscriber network, such as a cellular or Wi-Fi network.

The platform 1316 may abstract resources and functions to connect the computing device 1302 with other computing devices. The platform 1316 may also serve to abstract scaling of resources to provide a corresponding level of scale to encountered demand for the resources 1318 that are implemented via the platform 1316. Accordingly, in an interconnected device embodiment, implementation of functionality described herein may be distributed throughout the system 1300. For example, the functionality may be implemented in part on the computing device 1302 as well as via the platform 1316 that abstracts the functionality of the cloud 1314.

CONCLUSION

Although techniques have been described in language specific to structural features and/or methodological acts, it is to be understood that the subject matter defined in the appended claims is not necessarily limited to the specific features or acts described. Rather, the specific features and acts are disclosed as example forms of implementing the claimed subject matter.

What is claimed is:

1. In a digital media environment to facilitate creation of content using one or more computing devices, a method comprising:
    outputting, via a user interface for a digital media application, an image panel displaying image search results having candidate images for insertion in an image frame placed in a document exposed for editing via an editing panel of the user interface, wherein the image search results contain images matching at least one of image frame size or image frame shape;
    detecting input to select a particular image within an arrangement of candidate images displayed in the image panel;
    responsive to detection of the input, generating a preview image of the document having the particular image inserted into the image frame; and
    displaying the preview image in the user interface as a preview that replaces a view of the document exposed for editing in the editing panel as long as the input to select the particular image is maintained.

2. The method as described in claim 1, wherein the input does not constitute a selection of the designated image for insertion in the image frame.

3. The method as described in claim 1, wherein the image frame comprises a placeholder inserted into the document as part of creation of the document via the digital media application.

4. The method as described in claim 1, wherein displaying the preview image comprises rendering a view of the particular image in the image frame in-place within the document exposed for editing in the user interface.

5. The method as described in claim 1, wherein displaying the preview image comprises exposing a preview panel in the user interface that includes the preview as an element separate from the document exposed for editing in the user interface.

6. The method as described in claim 1, further comprising:
    recognizing conclusion of the input corresponding to the particular image; and
    updating the user interface to remove the preview.

7. The method of claim 1, wherein the input comprises navigation interaction to effectuate a hover selection of the particular image within the arrangement of candidate images.

8. The method of claim 1, wherein the input comprises navigation interaction to position the particular image within the arrangement of candidate images at a focus location in the user interface configured to trigger the preview.

9. The method of claim 1, further comprising:
displaying tag elements within the image frame in the user interface that correspond to query terms derived from content of the document in the vicinity of the image frame;
detecting selection of one or more tag elements to designate corresponding query terms for use in a search to obtain the search results; and
initiating the search to obtain the search results using designated query terms responsive to detecting the selection of the one or more tag elements.

10. The method of claim 1, further comprising:
detecting additional input to select a different image of the candidate images; and
responsive to detecting the additional input, updating the preview to switch to a view of the document as the document would appear if the different image is inserted into the image frame.

11. In a digital media environment to facilitate creation of content using one or more computing devices, a system comprising;
one or more processing devices;
one or more computer-readable media comprising storing instructions executable via the one or more processing devices to implement a search tool for a digital media application configured to perform operations to search for images that relate to an image frame included in a document exposed for editing in a user interface of the digital media application including:
analyzing context associated with the image frame including at least one of image frame size or image frame shape to derive contextual information;
parsing content corresponding to the image frame to identify named entities contained in the content;
generating tag elements corresponding to named entities that are identified;
exposing the tag elements in conjunction with the image frame to facilitate selection of one or more of the named entities to include as search parameters, wherein search parameters include image frame properties and document properties, for an image search to locate images for placement in the image frame;
responsive to a selection of one or more tag elements, causing the image search using named entities corresponding to selected tag elements along with contextual information as search parameters to obtain image search results from an image service; and
outputting an image selection user interface having an arrangement of multiple images returned by the image search, the image selection user interface configured to expose previews of the document as the document would appear with different images of the multiple images returned by the image search inserted into the image frame.

12. A system as recited in claim 11, wherein, the image selection user interface is configured to expose the previews by rendering each of the multiple images returned by the image search within the arrangement in a preview format representing the multiple images as being placed in the image frame in a thumbnail view of the document.

13. A system as recited in claim 12, wherein, the image selection user interface is further configured to include a control operable to toggle the arrangement of multiple images between a view in the preview format and a view as image search results.

14. A system as recited in claim 11, wherein the image selection user interface is configured to expose the previews as views of different images in-place within the image frame in the document exposed for editing in the user interface of the digital media application responsive to detection of navigation interaction configured to trigger the previews for different images at different times.

15. A system as recited in claim 11, wherein the image selection user interface further includes functionality to select and automatically insert one of the multiple images into the image frame within the document.

16. A system as recited in claim 11, wherein, the image selection user interface is output as a separate tab in the user interface of the digital media application.

17. A system as recited in claim 11, wherein the image selection user interface is output as a panel within the user interface for a digital media application.

18. In a digital media environment to facilitate creation of content using one or more computing devices, a method comprising:
exposing a document for editing in a user interface of a digital media application;
analyzing content of the document in the vicinity of an image frame in the document to derive contextual information to use for an image search to locate candidate images to place in the image frame that match the contextual information, wherein the contextual information includes at least one of image frame size or image frame shape;
passing the contextual information to an image service to cause the image service to conduct the image search; and
outputting an image selection user interface having an arrangement of multiple images returned by the image search;
rendering a preview of a particular image as being inserted into the image frame in the document exposed within the user interface of a digital media application responsive to positioning of a cursor proximate to the particular image in the arrangement.

19. The method as described in claim 18, wherein the contextual information includes indications regarding a color theme of the document and a shape of the image frame, wherein images returned by the image search are selected to match the color theme and the shape of the image frame.

20. The method as described in claim 18, wherein:
analyzing the content comprises detecting named entities indicated by the content; and
the contextual information passed to the image service includes one or more of the named entities to use as search parameters for the image search.

21. In a digital media environment to facilitate creation of content using one or more computing devices, a method comprising:
outputting, via a user interface for a digital media application, an image panel displaying image search results having candidate images for insertion in an image frame placed in a document exposed for editing via an editing panel of the user interface;

detecting input to select a particular image within an arrangement of candidate images displayed in the image panel, wherein the input comprises navigation interaction to position the particular image within the arrangement of candidate images at a focus location in the user interface configured to trigger the preview;

responsive to detection of the input, generating a preview image of the document having the particular image inserted into the image frame; and displaying the preview image in the user interface as a preview that replaces a view of the document exposed for editing in the editing panel as long as the input to select the particular image is maintained.

22. In a digital media environment to facilitate creation of content using one or more computing devices, a method comprising:

displaying tag elements within the image frame in the user interface that correspond to query terms derived from content of the document in the vicinity of the image frame;

detecting selection of one or more tag elements to designate corresponding query terms for use in a search to obtain the search results; and initiating the search to obtain the search results using designated query terms responsive to detecting the selection of the one or more tag elements;

outputting, via a user interface for a digital media application, an image panel displaying image search results having candidate images for insertion in an image frame placed in a document exposed for editing via an editing panel of the user interface;

detecting input to select a particular image within an arrangement of candidate images displayed in the image panel;

responsive to detection of the input, generating a preview image of the document having the particular image inserted into the image frame; and displaying the preview image in the user interface as a preview that replaces a view of the document exposed for editing in the editing panel as long as the input to select the particular image is maintained.

23. In a digital media environment to facilitate creation of content using one or more computing devices, a system comprising;

one or more processing devices;

one or more computer-readable media comprising storing instructions executable via the one or more processing devices to implement a search tool for a digital media application configured to perform operations to search for images that relate to an image frame included in a document exposed for editing in a user interface of the digital media application including:

parsing content corresponding to the image frame to identify named entities contained in the content;

generating tag elements corresponding to named entities that are identified;

exposing the tag elements in conjunction with the image frame to facilitate selection of one or more of the named entities to include as search parameters, wherein search parameters include image frame properties and document properties, for an image search to locate images for placement in the image frame;

responsive to a selection of one or more tag elements, causing the image search using named entities corresponding to selected tag elements as search parameters to obtain image search results from an image service; and outputting an image selection user interface having an arrangement of multiple images returned by the image search, the image selection user interface configured to expose previews of the document as the document would appear with different images of the multiple images returned by the image search inserted into the image frame, by rendering each of the multiple images returned by the image search within the arrangement in a preview format representing the multiple images as being placed in the image frame in a thumbnail view of the document.

24. A system as recited in claim 23, wherein the image selection user interface is further configured to include a control operable to toggle the arrangement of multiple images between a view in the preview format and a view as image search results.

25. In a digital media environment to facilitate creation of content using one or more computing devices, a method comprising:

exposing a document for editing in a user interface of a digital media application;

analyzing content of the document in the vicinity of an image frame in the document to derive contextual information to use for an image search to locate candidate images to place in the image frame that match the contextual information, wherein the contextual information includes indications regarding a color theme of the document and a shape of the image frame;

passing the contextual information to an image service to cause the image service to conduct the image search; and outputting an image selection user interface having an arrangement of multiple images returned by the image search, wherein the images returned are selected to match the color theme and the shape of the image frame;

rendering a preview of a particular image as being inserted into the image frame in the document exposed within the user interface of a digital media application responsive to positioning of a cursor proximate to the particular image in the arrangement.

* * * * *